(12) United States Patent
Tang et al.

(10) Patent No.: US 10,394,368 B2
(45) Date of Patent: Aug. 27, 2019

(54) TOUCH-SENSITIVE DISPLAY DEVICE

(71) Applicant: Microsoft Technology Licensing, LLC, Redmond, WA (US)

(72) Inventors: Yingying Tang, Wilsonville, OR (US); Sean M. Donnelly, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 302 days.

(21) Appl. No.: 15/169,551

(22) Filed: May 31, 2016

(65) Prior Publication Data

US 2017/0344173 A1 Nov. 30, 2017

(51) Int. Cl.
*G06F 3/044* (2006.01)
*G06F 3/041* (2006.01)
*G02F 1/1333* (2006.01)
*G06F 3/01* (2006.01)

(52) U.S. Cl.
CPC ...... *G06F 3/0416* (2013.01); *G02F 1/133345* (2013.01); *G06F 3/017* (2013.01); *G06F 3/044* (2013.01); *G06F 3/0412* (2013.01); *G06F 3/0414* (2013.01); *G06F 2203/04101* (2013.01); *G06F 2203/04106* (2013.01)

(58) Field of Classification Search
CPC ...... G06F 3/0414; G06F 3/044; G06F 1/3262; G06F 3/0416; G02F 1/133345
USPC .......................................... 345/174; 455/566
See application file for complete search history.

(56) References Cited

U.S. PATENT DOCUMENTS

| | | | |
|---|---|---|---|
| 8,390,597 | B2 | 3/2013 | Bernstein |
| 9,001,082 | B1 | 4/2015 | Rosenberg et al. |
| 9,007,342 | B2 | 4/2015 | Grivna et al. |
| 9,019,209 | B2 | 4/2015 | Geaghan |
| 9,151,792 | B1 | 10/2015 | Kremin et al. |
| 9,250,752 | B2 | 2/2016 | Karpin et al. |

(Continued)

OTHER PUBLICATIONS

Chamary, JV, "3D Touch in iPhone 6S Isn't Just a Gimmick. Here's How It Works", Published on: Sep. 12, 2015 Available at: http://www.forbes.com/sites/jvchamary/2015/09/12/3d-touch-iphone-6s/#6f0f8103abc0.

(Continued)

*Primary Examiner* — Abdul-Samad A Adediran
(74) *Attorney, Agent, or Firm* — Alleman Hall Creasman & Tuttle LLP (57) ABSTRACT

Embodiments of a touch-sensitive display device are disclosed herein. According to a first aspect, a touch-sensitive display device comprises an electrode matrix including transmit electrodes and receive electrodes; a conductive plane; and a controller configured to cause a transmit electrode driver to drive the transmit electrodes in a mutual capacitance mode. The controller is configured to cause the transmit electrodes, the receive electrodes, and the conductive plane to be connected to a common charging voltage during charge periods of a self-capacitance mode; to, during discharge periods of the self-capacitance mode that alternate with the charge periods, cause the transmit electrodes, the receive electrodes, and the conductive plane to be connected to a common reference voltage; and to, during the discharge periods, cause the transmit electrodes and the receive electrodes to be coupled to receive circuitry configured to measure self-capacitance of the transmit electrodes and the receive electrodes.

22 Claims, 7 Drawing Sheets

(56) References Cited

U.S. PATENT DOCUMENTS

| | | |
|---|---|---|
| 2006/0197753 A1 | 9/2006 | Hotelling |
| 2011/0007021 A1 | 1/2011 | Bernstein et al. |
| 2011/0234528 A1 | 9/2011 | Guedon et al. |
| 2012/0026123 A1 | 2/2012 | Grunthaner et al. |
| 2012/0050180 A1 | 3/2012 | King et al. |
| 2012/0086666 A1 | 4/2012 | Badaye et al. |
| 2013/0100071 A1* | 4/2013 | Wright .................. G06F 1/3262 345/174 |
| 2013/0257784 A1 | 10/2013 | Vandermeijden et al. |
| 2015/0035787 A1 | 2/2015 | Shahparnia et al. |
| 2015/0091858 A1* | 4/2015 | Rosenberg ............ G06F 3/0414 345/174 |
| 2015/0169114 A1 | 6/2015 | King et al. |
| 2015/0169121 A1 | 6/2015 | Yao et al. |
| 2015/0242043 A1* | 8/2015 | Oda ........................ G06F 3/044 345/174 |
| 2015/0296062 A1* | 10/2015 | Lee .................. G02F 1/133345 455/566 |
| 2015/0370376 A1 | 12/2015 | Harley et al. |
| 2017/0199611 A1* | 7/2017 | Brunet .................. G06F 3/0416 |

OTHER PUBLICATIONS

Hu, et al., "3D Gesture-Sensing System for Interactive Displays Based on Extended-Range Capacitive Sensing", In Proceedings of IEEE International Solid-State Circuits Conference, Feb. 11, 2014, pp. 212-213.
ISA European Patent Office, International Search Report and Written Opinion Issued in PCT Application No. PCT/US2017/032991, dated Jul. 20, 2017, WIPO, 15 Pages.

* cited by examiner

TOUCH-SENSITIVE DISPLAY DEVICE

BACKGROUND

Various approaches to sensing touch and hover input have been developed. While some implementations only sense either touch or hover input, other implementations combine touch and hover sensing in a single device. A device configured to receive touch and hover input may sense touch input capacitively while sensing hover input with infrared image sensors, for example.

DETAILED DESCRIPTION

As described above, a variety of approaches have been developed for sensing touch and hover input in relation to the user-facing surface of computing devices. While some implementations can only sense one type, other implementations combine touch and hover sensing in a single device. For example, a device configured for both touch and hover sensing may employ capacitive sensing (e.g., via an electrode matrix) to receive touch input, and (e.g., infrared) image sensors to receive hover input. The use of capacitive and image-based sensing mechanisms to respectively receive touch and hover input, however, increases device cost and complexity. For some devices, this may be compounded by the inclusion of multiple image sensors for sensing hover over substantially the entirety of an input surface. Other devices may increase cost and complexity by providing separate sensors for detecting touch and measuring force, respectively.

To address these and other issues, implementations of a touch-sensitive display device operable to sense touch and hover input are disclosed herein. As described below, capacitive sensing may be used to receive both touch and hover input, among other inputs such as force measurements and three-dimensional hand gestures.

Figure 1:
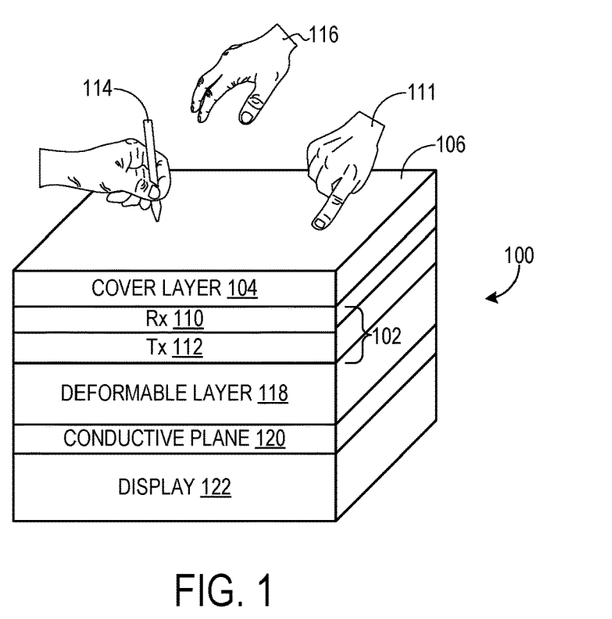
FIG. 1 schematically shows a touch-sensitive display stack configured to sense touch and hover input.

FIG. 1 schematically shows a touch-sensitive display stack 100 configured to sense touch and hover input. To this end, display stack 100 includes an electrode matrix 102 above which a cover layer 104 is positioned. Cover layer 104 may be comprised of glass, plastic, or any other suitable material, and may protect display stack 100 from debris and forces while providing a surface 106 to which touch can be applied.

Figure 2:
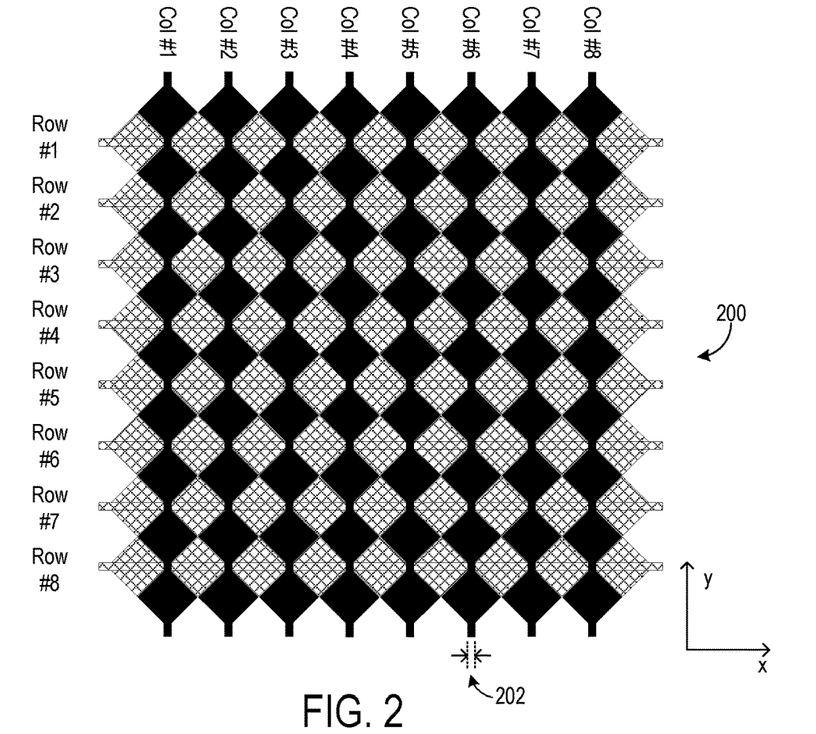
FIG. 2 shows an example electrode matrix.

Electrode matrix 102 includes a plurality of transmit (Tx) electrodes 112 and a plurality of receive (Rx) electrodes 110. In one example, Tx electrodes 112 and Rx electrodes 110 may be formed on two separate thin films as shown in FIG. 1, and may be bonded together by an optically clear adhesive (OCA) not shown in FIG. 1. Other arrangements are possible, however, including those in which Tx electrodes 112 and Rx electrodes 110 are respectively formed on opposite sides of a single substrate, and those in which Tx electrodes 112 and Rx electrodes 110 are formed on a single layer along with jumpers arranged to electrically isolate the Tx and Rx electrodes. Turning briefly to FIG. 2, an example electrode matrix 200 is shown, which includes Tx electrodes 112 and Rx electrodes 110 arranged in a diamond pattern. The example shown in FIG. 2 depicts eight rows of Tx electrodes 112 and eight columns of Rx electrodes 110, though any suitable number and arrangement are contemplated. Tx electrodes 112 and Rx electrodes 110 may be comprised of indium tin oxide (ITO), metal meshes, silver nanowires, or any other suitable materials.

As described in further detail below, electrode matrix 102 may be selectively operated in a mutual capacitance mode or in a self-capacitance mode. In the mutual capacitance mode, touch input may be detected such as touch input from a human hand 111 and/or from an input object such as a stylus 114. In the self-capacitance mode, hover input may be detected such as hover input from a hovering human hand 116.

Touch-sensitive display stack 100 further includes a deformable layer 118 configured to resiliently deform in response to the application of force (e.g., applied to surface 106). Deformable layer 118 may be comprised of a soft silicone elastomer, urethane elastomer, acrylic film, or any other suitable material, and allows electrode matrix 102 to resiliently deflect toward a conductive plane 120, which, as described in further detail below, may facilitate a capacitive measurement of force.

Conductive plane 120 may be comprised of a polymer film covered with ITO, a metal mesh, a silver nanowire dispersion, or any other suitable material/arrangement. In some implementations, conductive plane 120 may be a discrete layer separate from the other components in touch-sensitive display stack 100, while in other examples an existing layer in a display may be employed as the conductive plane. For example, some liquid crystal displays (LCDs) include an ITO layer, which may shield the display from electromagnetic discharge, located on an exterior surface of a color filter plate. In this example, the display ITO layer may be employed as conductive plane 120.

Touch-sensitive display stack 100 further includes a display 122 positioned at the bottom of the display stack. Display 122 may assume any suitable form (e.g., LCD, OLED, CRT) and may output graphical content for observation by users, which in some examples may be generated based on user input. As described in further detail below, display 122 is placed in a shielded position relative to conductive plane 120, which may shield the display from electromagnetic interference originating from electrode matrix 102, and the electrode matrix from electromagnetic interference originating from the display. Conductive plane 120 may cover substantially the entire area of display 122 (e.g., as viewed in a direction normal to surface 106). For examples in which display 122 includes an ITO layer, this ITO layer may be employed as conductive plane 120 in the manner described above.

In view of the above, touch-sensitive display stack 100 may be operable to sense touch input, hover input including three-dimensional hand gestures, and applied force all via a common capacitive sensing mechanism. By consolidating these functions into a single stack, the cost and complexity of display stack 100 may be reduced relative to other approaches that employ different types of sensing mechanisms or multiple sensing mechanisms of a common type for different inputs.

Figure 3:
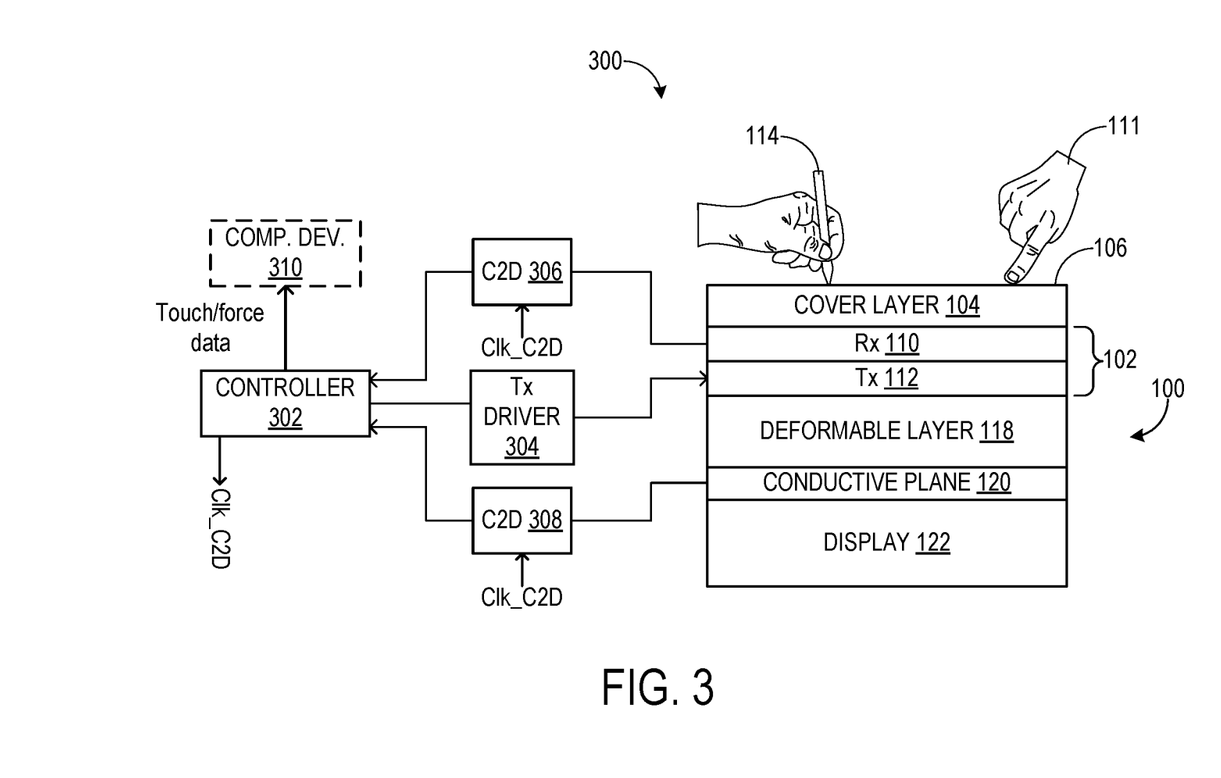
FIG. 3 schematically depicts a touch-sensitive display device incorporating the touch-sensitive display stack of FIG. 1, configured to operate in a mutual capacitance mode.
Figure 6:
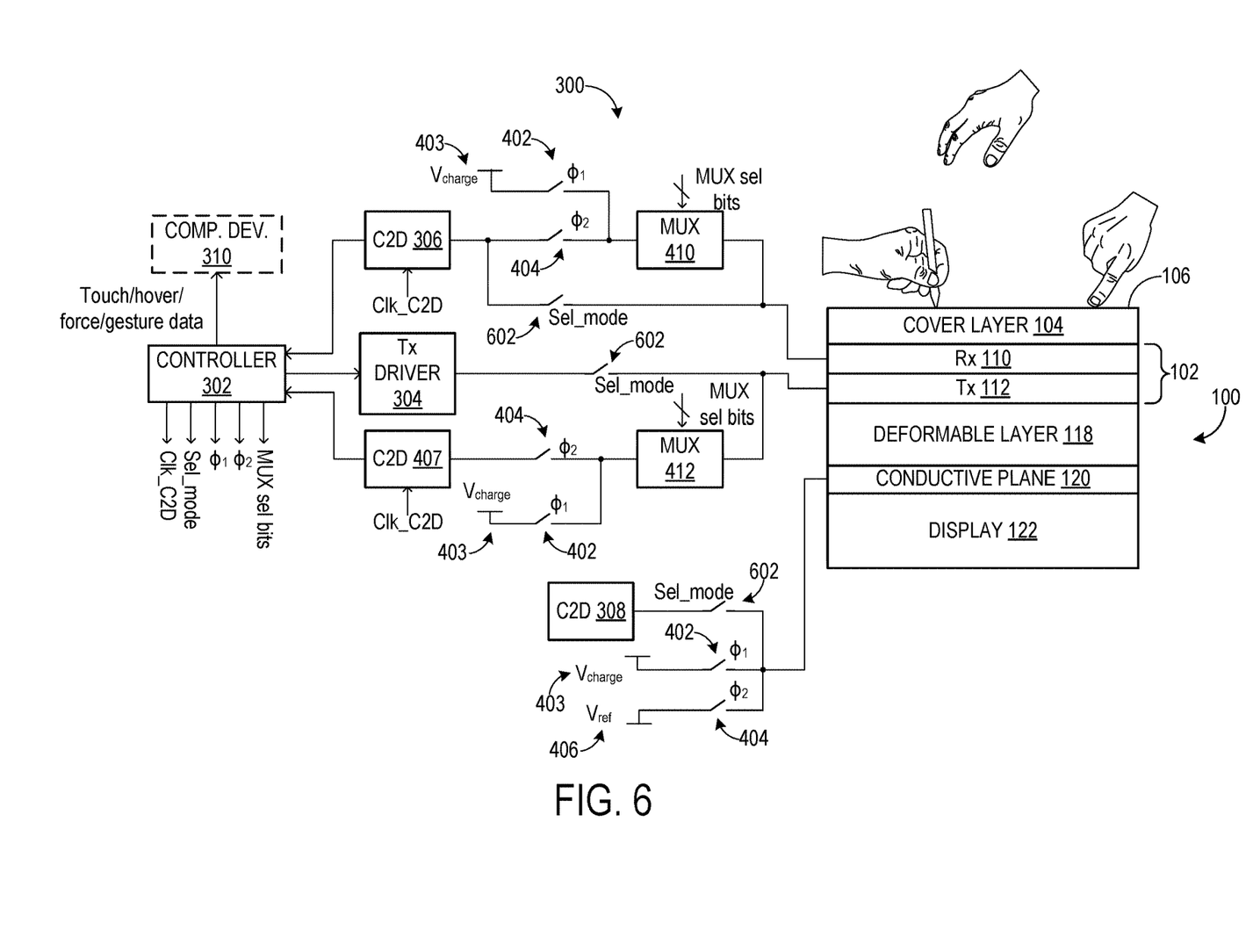
FIG. 6 schematically shows circuitry that may be coupled to the touch-sensitive display device of FIG. 3 depending on a selection of the mutual and self-capacitance modes.

FIG. 3 schematically depicts a touch-sensitive display device 300 incorporating touch-sensitive display stack 100 of FIG. 1. In particular, FIG. 3 illustrates display device 300 configured to operate in a mutual capacitance mode. As described in further detail below with reference to FIG. 4, display device 300 may include other components not shown in FIG. 3 that are decoupled from the display device when operating in the mutual capacitance mode and coupled to the display device when operating in a self-capacitance mode. FIG. 6 illustrates circuitry that may be coupled to or decoupled from display device 300 depending on the selected mode.

As described above, a mutual capacitance mode may be used to detect touch input applied to surface 106 of touch-sensitive display stack 100. To facilitate operation in the mutual capacitance mode, a controller 302 may be configured to cause a Tx electrode driver 304 to drive Tx electrodes 112 in the mutual capacitance mode. In one example, Tx electrode driver 304 may sequentially apply AC voltages on each Tx electrode 112. Touch inputs may be detected based on resulting currents—e.g., that result from driving Tx electrodes 112—induced on Rx electrodes 110. The resulting currents may be received by a current-to-digital (C2D) converter 306 where the currents may be digitized and provided as digital output to controller 302, which may then analyze the digital output to detect touch. The presence of human hand 111 or other touch objects may cause a decrease in the capacitance between Rx electrodes 110 and Tx electrodes 112, which may be reflected in the digital output from C2D 306 and received by controller 302. Detail regarding the configuration of an example C2D is provided below with reference to FIG. 7.

As described above, conductive plane 120 may facilitate a capacitive measurement of force in the mutual capacitance mode. To this end, conductive plane 120 may cooperate with electrode matrix 102 and deformable layer 118 to generate the capacitive measurement of force. In response to the application of force to surface 106, at least a portion of electrode matrix 102 (e.g., Tx electrodes 112) may be configured to resiliently deflect relative to conductive plane 120 via the deformability of deformable layer 118. As deformable layer 118 is compressed, the distance between electrode matrix 102 and conductive plane 120 changes, in turn increasing the capacitance between the electrode matrix and conductive plane. As such, the capacitive measurement of force may be measured between the resiliently deflecting portion of electrode matrix 102 and conductive plane 120. A C2D 308 coupled to conductive plane 120 may be configured to receive from the conductive plane this capacitive measurement of force, which can then be digitized and relayed to controller 302.

To charge the capacitor between electrode matrix 102 (e.g., Tx electrodes 112) and conductive plane 120, and thus enable force measurement based on changes in the value of the capacitor, the Tx electrodes and conductive plane may be charged to different voltages. As described above, Tx electrodes 112 may be sequentially driven with AC voltages. In addition, conductive plane 120 may be coupled to a reference voltage (e.g., fixed) at the input of C2D 308. This reference voltage may also be applied to the input of C2D 306 coupled to Rx electrodes 110. As such, the reference voltage may be referred to as a 'common' reference voltage, anti controller 302 may be configured to cause Rx electrodes 110 and conductive plane 120 to be connected to the common reference voltage in the mutual capacitance mode. To provide the common reference voltage, an inner feedback loop of C2Ds 306 and 308 may maintain the input nodes of the C2Ds at the common reference voltage. Additional detail regarding the provision of the common reference voltage is described below with reference to FIG. 7.

The coupling of conductive plane 120 to the common reference voltage may provide electromagnetic shielding of display 122 as described above. Particularly, the charging of capacitors between electrode matrix 102 and display 122 may be prevented in this manner. In addition to shielding display 122 from electromagnetic interference (e.g., from Tx electrodes 112), conductive plane 120 may shield the electrode matrix (e.g., Rx electrodes 110) from electromagnetic interference from the display. In this way, the signal-to-noise ratio (SNR) of touch sensing may increase.

FIG. 3 illustrates the potential coupling of a computing device 310 to controller 302. As shown therein, controller 302 may provide touch and/or force data, including but not limited to an x-coordinate of touch, a y-coordinate of touch, and a magnitude of applied force. Computing device 310 may interpret such touch and/or force data as user input, and may render graphical content based thereon.

Figure 4:
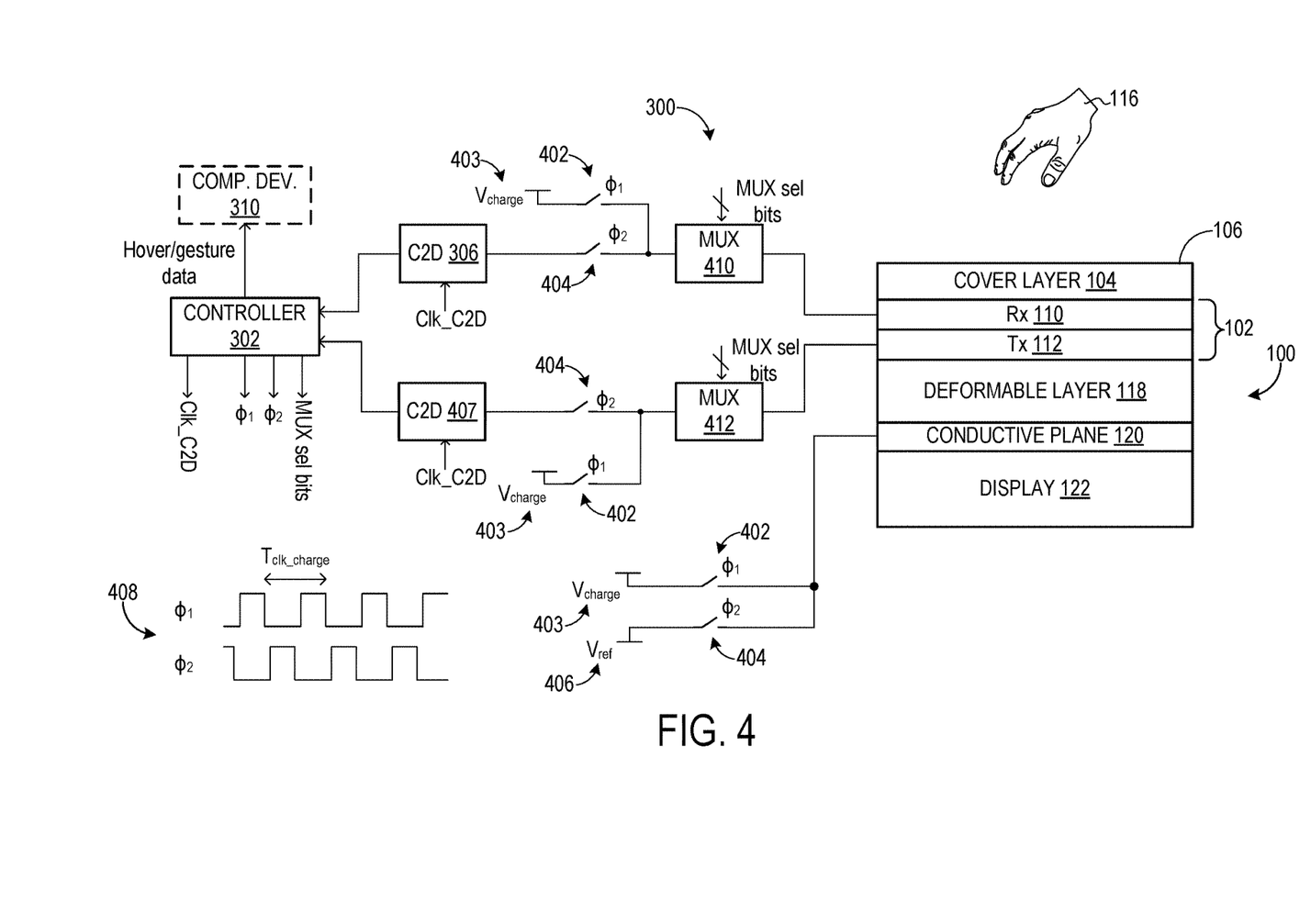
FIG. 4 schematically depicts the touch-sensitive display device of FIG. 3, configured to operate in a self-capacitance mode.

FIG. 4 schematically depicts touch-sensitive display device 300 configured to operate in a self-capacitance mode. Components of display device 300 shown in FIG. 3 but not shown in FIG. 4 may be decoupled from the display device when operating in the self-capacitance mode. FIG. 6 illustrates circuitry that may be coupled to or decoupled from display device 300 depending on the selected mode.

As described above, the self-capacitance mode may be engaged to detect hover input proximate surface 106 of touch-sensitive display stack 100. In contrast to the mutual capacitance mode, self-capacitances of Rx electrodes 110 and Tx electrodes 112 may be measured to detect hover input, as the measurement of self-capacitance may enable the detection of hover objects in a significantly greater range of z-distances from surface 106, relative to the z-distance range provided by the mutual capacitance mode. The detection of hover input may include determining x/y/z/coordinates of a hover object and/or three-dimensional hand gestures performed, for example, by human hand 116.

The self-capacitance mode may include charge periods that alternate with discharge periods, each of which may be enabled by actuating respective switches. In particular, controller 302 may be configured to cause Rx electrodes 110, Tx electrodes 112, and conductive plane 120 to be connected to a common charging voltage $V_{charge}$ during the charge periods by causing a plurality of $\varphi_1$ switches 402 to close, which couples these elements of touch-sensitive display stack 100 to a fixed voltage source 403 providing $V_{charge}$. Conversely, controller 302 may be configured to cause Rx electrodes 110, Tx electrodes 112, and conductive plane 120 to be connected to a common reference voltage $V_{ref}$ during the discharge periods by causing switches 402 to open, and a plurality of $\varphi_2$ switches 404 to close. As shown in FIG. 4, the closing of switches 404 may cause coupling of Rx electrodes 110 and Tx electrodes 112 to the inputs of C2D 306 and a C2D 407, respectively, which as described above may be maintained at the common reference voltage via inner feedback loops. The closing of switches 404 may further cause coupling of conductive plane 120 to a fixed voltage source 406 providing the common reference voltage $V_{ref}$.

While shown as a discrete voltage source, fixed voltage source 406 may alternatively be implemented by providing the common reference voltage $V_{ref}$ at the input of C2D 308 as with C2Ds 306 and 407. The common reference voltage $V_{ref}$ provided to electrode matrix 102 and conductive plane 120 during the discharge periods may be the same as the common reference voltage provided to Rx electrodes 110 and the conductive plane in the mutual capacitance mode.

During the charge periods, charges of magnitude $C_{Rx\_gnd}V_{charge}$ and $C_{Tx\_gnd}V_{charge}$ may be stored on the self-capacitors of Rx electrodes 110 and Tx electrodes 112, respectively, where $C_{Rx,\ gnd}$ and $C_{Tx,\ gnd}$ are the respective self-capacitances of the Rx and Tx electrodes. During the discharge periods of the self-capacitance mode, controller 302 may be configured to cause Rx electrodes 110 and Tx electrodes 112 to be coupled to receive circuitry configured to measure the self-capacitances of the receive electrodes and the transmit electrodes. As shown in FIG. 4, by closing switches 404 as described above, Rx electrodes 110 and Tx electrodes 112 may be respectively coupled to C2Ds 306 and 407, and consequently coupled to the common reference voltage $V_{ref}$ as described above. C2Ds 306 and 407 may respectively measure the self-capacitances of Rx electrodes 110 and Tx electrodes 112—e.g., the charges stored on their respective self-capacitors $C_{Rx\_gnd}V_{charge}$ and $C_{Tx\_gnd}V_{charge}$ may be depleted by their corresponding C2Ds (e.g., to the extent that charges $C_{Rx\_gnd}V_{ref}$ and $C_{Tx\_gnd}V_{ref}$ respectively remain). The time-averaged currents sensed by C2Ds 306 and 407 may be $C_{tx\_gnd}(V_{charge}-V_{ref})/T_{clk\_charge}$ or $C_{rx\_gnd}(V_{charge}-V_{ref})/T_{clk\_charge}$, respectively, where $T_{clk\_charge}$ is the clock period of the charge and discharge periods. In other examples, the charge and discharge periods may exhibit differing clock periods.

FIG. 4 shows a timing diagram 408 illustrating clock signals φ1 and φ2 that may be used to drive the charge and discharge periods of the self-capacitance mode, respectively. The clock signals $\varphi_1$ and $\varphi_2$ may further represent the current and/or voltage through the switches respectively corresponding to the charge and discharge periods—e.g., through $\varphi_1$ switches 402 (during the charge periods and through $\varphi_2$ switches 404 during the discharge periods. Timing diagram 408 illustrates how, in some implementations, the clock signals $\varphi_1$ and $\varphi_2$ may exhibit differing duty cycles (e.g., to support sufficient charging and accurate depletion).

When implemented as an array of row and column electrodes, Rx electrodes 110 may be used to detect one of x-coordinate and y-coordinate motion of a hover object, and Tx electrodes 112 may be used to detect the other of the x-coordinate and y-coordinate motion. Returning briefly to FIG. 2, electrode matrix 200 illustrates an example arrangement of Rx electrodes 110 and Tx electrodes 112 in a rectangular array. When a hover object hovers above Rx electrodes 110 and Tx electrodes 112, the self-capacitances of the electrodes may increase, enabling the x, y, and z coordinates of the hover object to be sensed. To enable a similar sensing resolution of the z-coordinate when the hover object moves in the x or y direction, it may be desired to minimize the area where Rx electrodes 110 and Tx electrodes 112 overlap. In this way, the degree to which electrodes (e.g., Tx electrodes 112) farther away from the hover object are shielded by electrodes (e.g., Rx electrodes 110) closer to the hover object may be minimized. As one example, the minimization of electrode overlap may be accomplished by minimizing a neck width 202.

Returning to FIG. 4, conductive plane 120 may be coupled to the common charge voltage $V_{charge}$ during charge periods of the self-capacitance mode and to the common reference voltage $V_{ref}$ during discharge periods. By applying this electrical coupling to conductive plane 120 and to electrode matrix 102 in the self-capacitance mode, the conductive plane may provide an electromagnetic shielding function similar to the shielding function provided in the mutual capacitance mode. Further, charging of the capacitors between Rx electrodes 110 and conductive plane 120, and between Tx electrodes 112 and the conductive plane, can be avoided. These capacitances might otherwise be dominant in the measured self-capacitances, increasing the difficulty of detecting the relatively small capacitance changes introduced by hover object presence. In this manner the SNR of hover sensing may be increased.

Controller 302, which may provide touch and/or force data as described above, may alternatively or additionally provide hover and/or gesture data to computing device 310. As described above, the hover and/or gesture data may include one or more of a hover object x-coordinate, y-coordinate, z-coordinate, and three-dimensional hand gesture. Computing device 310 may interpret such hover and/or gesture data as user input, and may render graphical content based thereon.

FIG. 4 also illustrates how subsets of electrode matrix 102 may be multiplexed to achieve desired hover sensing conditions. In some examples, the widths of Rx electrodes 110 and Tx electrodes 112 may be smaller than 1 cm to facilitate precise detection of the x/y position of touch input. However, the width/coverage area may be insufficient to form a detectable capacitance corresponding to hover objects such as human hand 116 positioned tens of centimeters away from surface 106. As such, controller 302 may be configured to cause, in the self-capacitance mode, electrode subsets of Rx electrodes 110 and Tx electrodes 112 to be multiplexed together. Receive circuitry may be configured to measure the self-capacitance of each electrode subset.

Figure 5A:
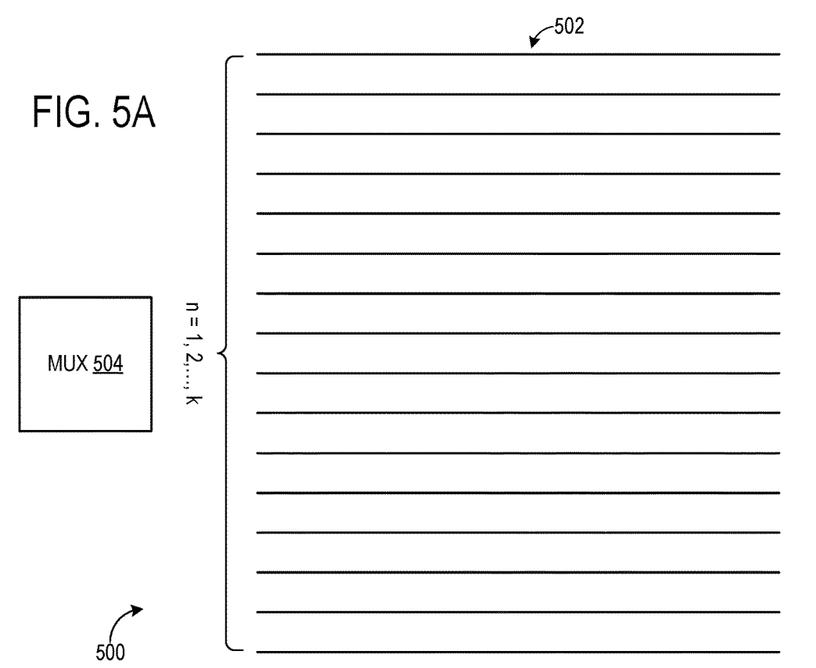
FIGS. 5A and 5B schematically illustrate electrode multiplexing in the touch-sensitive display device of FIG. 3.

In some implementations, electrode multiplexing may be carried out by electrically coupling electrodes together. To this end, FIG. 4 shows multiplexers 410 and 412 configured to multiplex electrodes of Rx electrodes 110 and Tx electrodes 112, respectively. As further detail regarding multiplexing, FIG. 5A shows an example circuit 500 for multiplexing electrode subsets of an electrode array 502 together. Electrode array 502 may represent Rx electrodes 110 or Tx electrodes 112, for example, and comprises a plurality of electrodes that may be electrically coupled together by a multiplexer 504 to form k electrode subsets. Multiplexer 504 may be implemented as an array of switches or in any other suitable manner. In particular, an integer number n of electrodes may be electrically coupled together to form k subsets; in the example depicted in FIGS. 5A and 5B, 2 grouped electrodes forms 8 subsets, 4 grouped electrodes forms 4 subsets, 8 grouped electrodes forms 2 subsets, 16 grouped electrodes forms 1 subset, etc. Electrode array 502 may comprise any suitable number of electrodes, however, and any suitable number of electrode subsets may be formed, including subsets that differ in number.

Figure 5B:
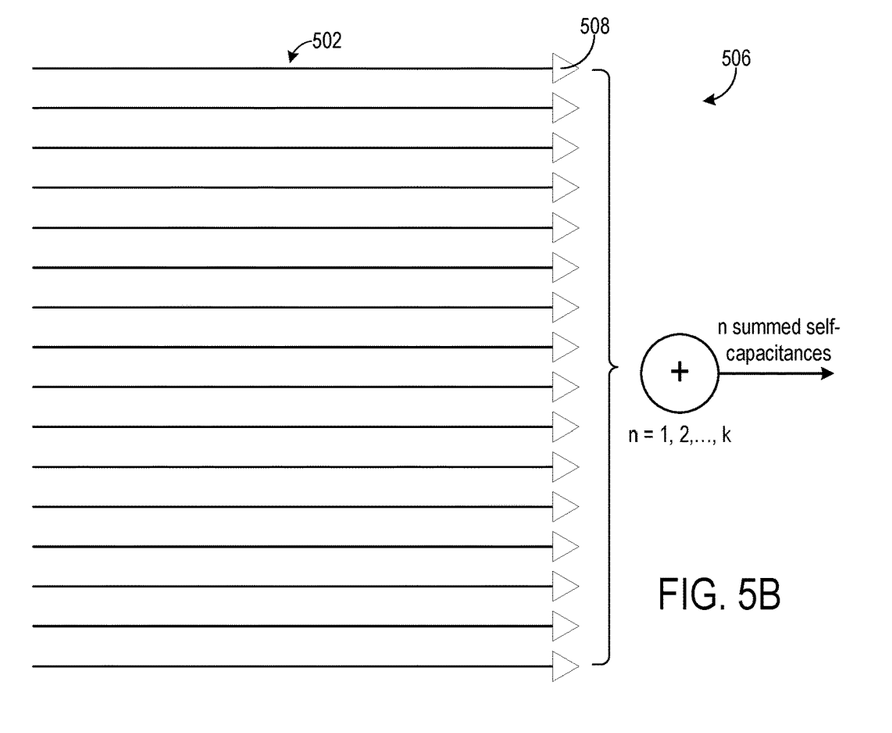

In other implementations, multiplexing electrode subsets of transmit and receive electrodes may include, for each subset, summing the measured self-capacitances of each electrode in that subset. To this end, FIG. 5B shows a circuit 506 for summing the self-capacitances of electrodes in electrode subsets of electrode array 502. In this example, receive circuitry—e.g., C2Ds such as C2D 508—may be coupled to each electrode in electrode array 502. For each electrode subset, the outputs (e.g., measured self-capacitances) of the C2Ds 508 of each electrode in the subset may be summed to determine a total self-capacitance of that subset. As with circuit 500, any suitable number of electrode subsets may be formed by summing any suitable number of C2D outputs. C2D outputs may be summed at a summer 510, which may be implemented in controller 302, for example, or may be a component separate therefrom. Electrode multiplexing by summing C2D outputs may facilitate the omission of multiplexing hardware configured to electrically couple electrodes together, and may enable the output of capacitive data for every possible value of k in every frame (e.g., a complete scan of an electrode matrix).

Returning to FIG. 4, greater values of n (i.e., greater numbers of multiplexed electrodes) may enable hover sensing in a greater range of z-distances from surface 106. However, as n increased, the resolution of x/y position sensing may decrease. As such, controller 302 may be configured to change a number of electrodes in electrode subsets over time—e.g., to change n or k to achieve a desired balance between x./y and z position sensing. In one example, controller 302 may be configured to change the number of electrodes in the electrode subsets based on a z-coordinate of an input object such as human hand 116. The z-coordinate may be determined based on the self-capacitance of Rx electrodes 110 and Tx electrodes 112 as described above. In this example, upon initiation of the self-capacitance mode, a larger or maximum number of electrodes may be multiplexed to maximize z resolution. As the input object comes closer to surface 106, the number of multiplexed electrodes may be reduced to increase x/y resolution. Alternative or additional approaches may consider the SNR of hover sensing—for example, when the SNR of the input object exceeds a threshold, the number of multiplexed electrodes may be reduced by 1, a factor of 2, or any other suitable integer.

Turning now to FIG. 6, touch-sensitive display device 300 is shown including circuitry that may be coupled to or decoupled from the display device depending on whether the mutual capacitance mode or the self-capacitance mode is selected. "Coupled" and "decoupled," as used herein, can refer to a physical connection (e.g., operation of a transistor or other switching mechanism), and/or any other mechanism in which the circuitry componentry is selectively enabled or disabled with respect to providing a particular functionality.

FIG. 6 illustrates how the selection of the mutual and self capacitance modes may be effected by actuating respective switches. In particular, controller 302 may engage the mutual capacitance mode by actuating a plurality of Sel_mode switches 602, causing the coupling of Rx electrodes 110 to C2D 306, Tx electrodes 112 to Tx driver 304, and conductive plane 120 to C2D 308. The self-capacitance mode, and charge and discharge periods thereof, may be engaged by actuating $\varphi_1$ switches 402 and $\varphi_2$ switches 404 as described above.

FIG. 6 further illustrates an example implementation of the receive circuitry of touch-sensitive display device 300. In the depicted example, C2Ds 306, 308, and 407 may be collectively referred to as receive circuitry, as these elements may receive capacitive measurements in various modes. In some implementations, a respective C2D may be provided for each Rx electrode 110 and/or for each Tx electrode 112. C2Ds 306, 308, and 407 may employ different operational parameters in the mutual and self-capacitance modes, such as gain, processing algorithms, etc. Further, while FIG. 6 depicts the use of separate C2Ds 308 and 407 for receiving capacitive measurements from conductive plane 120 and Tx electrodes 112, respectively, in other implementations a consolidated C2D may be provided for these elements in combination with a switching mechanism. The consolidated C2D may be coupled to conductive plane 120 in the mutual capacitance mode and to Tx electrodes 112 in the self-capacitance mode. Regardless, FIG. 6 illustrates how common receive circuitry can be used to implement mutual and self-capacitance modes and thereby detect both touch and hover input. This configuration may enable reduced cost and complexity relative to approaches that provide separate receive circuitry for touch and hover input detection.

Controller 302 may be configured to switch between the mutual capacitance mode and the self-capacitance mode based on an input object condition. Switching between the mutual and self-capacitance modes may include interrupting the self-capacitance mode with the mutual capacitance mode at a first interval based on the input object condition. In some examples, the mutual capacitance mode may not positively identify touch input—e.g., an input object in contact with surface 106. As such, it may be advisable to interrupt the self-capacitance mode with the mutual capacitance mode to capture touch inputs in a reasonable time frame. The first interval at which interruption occurs may be based on a z-coordinate of the input object such that, as the input object comes closer to surface 106 the first interval decreases—i.e., checks for touch input are performed more regularly, as touch input may be considered more likely the closer the input object is to the surface. Conversely, checks for touch input may performed less regularly as the z-coordinate of the input object increases relative to surface 106, as touch input may be considered less likely the farther away the input object is from the surface.

Switching between the mutual and self-capacitance modes may include interrupting the mutual capacitance mode with the self-capacitance mode at a second interval. It may be advisable, even when touch input is positively detected in the mutual capacitance mode, to interrupt (e.g., regularly) the mutual capacitance mode with the self-capacitance mode so that the presence of hover objects is identified in a reasonable time frame. In some scenarios, both the mutual and self-capacitance modes may be leveraged to receive touch and hover input from the same user—e.g., as supplied by respective hands of the user. In other scenarios, both the mutual and self-capacitance modes may be leveraged to receive touch and hover input from different users. The second interval at which interruption of the mutual capacitance mode may occur may be predetermined or based on various suitable criteria (e.g., a probabilistic assessment of the likelihood of hover object presence, user preferences).

Other considerations may drive switches between the mutual and self-capacitance modes. For example, if the SNR of input sensing decreases by a threshold amount or falls below a threshold level, a switch in sensing modes may occur. Alternatively or additionally, if a minimum SNR is not detected for a threshold time, a switch in sensing modes may occur. In some implementations, various operational parameters may differ between modes—e.g., the mutual and self-capacitance modes may exhibit different drive frequencies and/or duty cycles.

Figure 7:
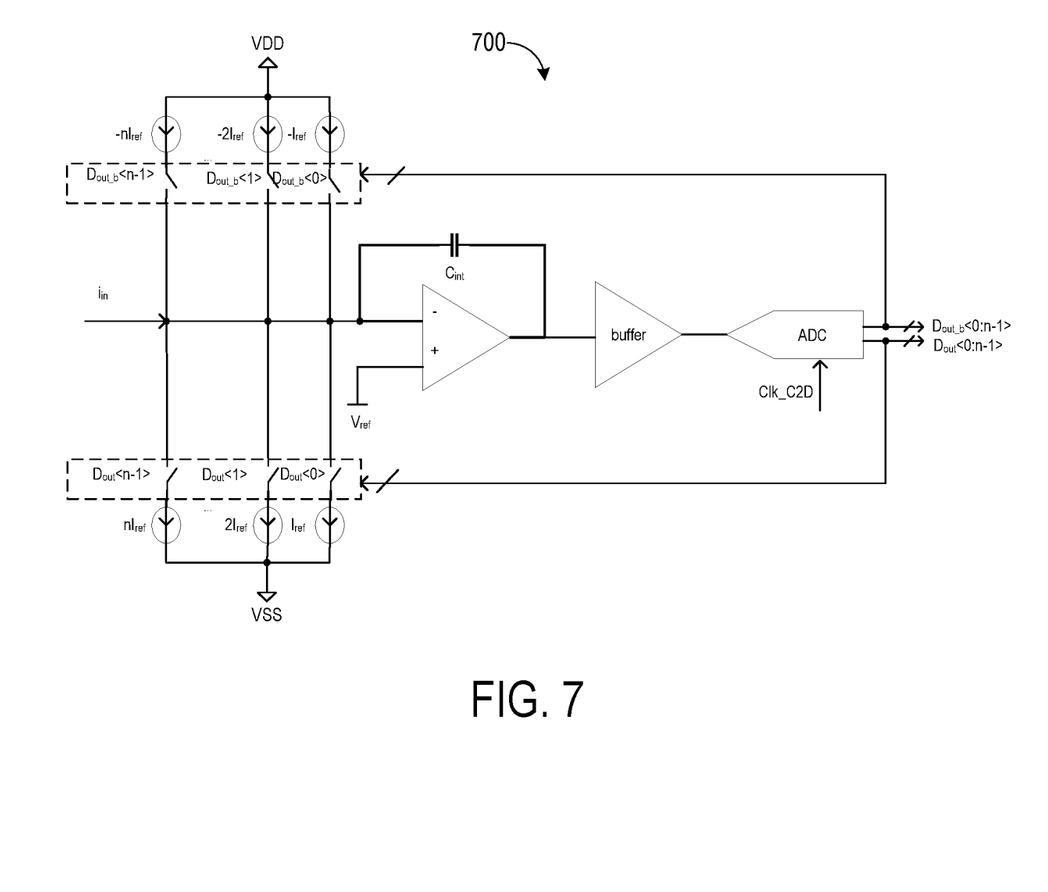
FIG. 7 schematically shows an example C2D circuit.

FIG. 7 schematically shows an example C2D circuit 700. Circuit 700 may be implemented by a sigma-delta convertor. The digital outputs $D_{out}<0:n-1>$ and $D_{out\_b}<0:n->$ of an N-bit ADC may control the amount of current that should be steered into or out of the input node of a front-end integrator, so that the average current integrated on a capacitor $C_{int}$ is 0. $D_{out}<0:n-1>$ and $D_{out\_b}<0:n-1>$ may also be the outputs of the entire C2D, indicating the magnitude and direction of the input current. The N-bit ADC may be a single comparator or a latch, for example. The frequency of a clock signal clk_C2D supplied to C2Ds (e.g., C2Ds 306, 308, 407) may be much larger than the frequencies of the voltage signals applied by Tx driver 304 in touch mode and the frequencies of the charge and discharge clock cycles $\varphi_1$ and $\varphi_2$ in hover mode, for satisfactory SNR. Other variants of the sensor stacks and sensing electronics disclosed herein are possible without departing from the scope of this disclosure, however. Touch-sensitive display device 300 (FIG. 6), for example, may employ receive circuitry comprising alternatives to the C2Ds described herein.

The inner feedback loop of circuit 700 may maintain the input node at a fixed voltage during at least some portions of operation. Feedback current may be steered in or out of the negative input node of the first stage opamp (e.g., which may also be the input node of the C2D) to force voltage of the negative input node equal to that of the positive input node of the opamp which is connected to a fixed voltage source $V_{ref}$. In some cases, $V_{ref}$ may be zero.

Figure 8:
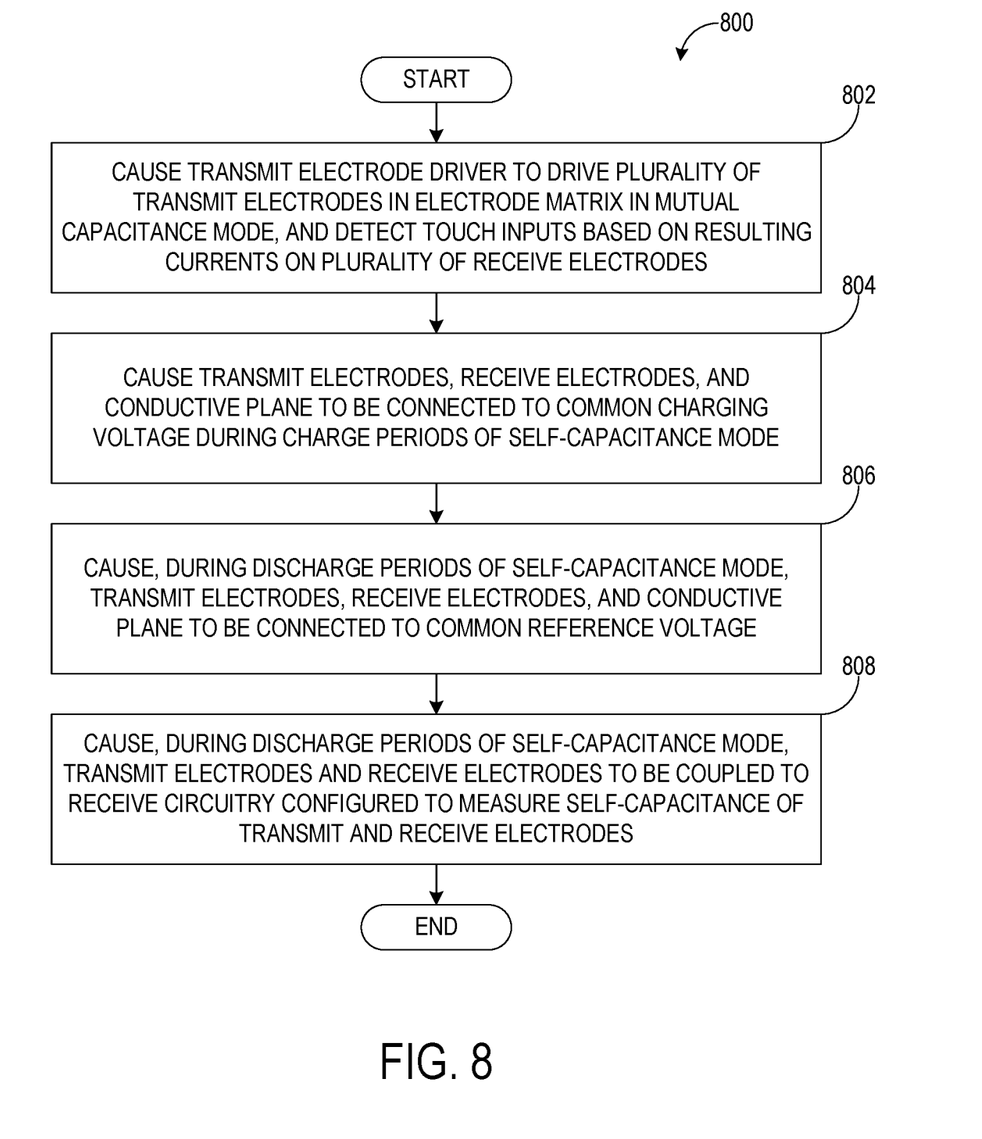
FIG. 8 shows a flowchart illustrating a method of implementing a mutual capacitance mode and a self-capacitance mode in a touch-sensitive display device.

FIG. 8 shows a flowchart illustrating a method 800 of implementing a mutual capacitance mode and a self-capacitance mode in a touch-sensitive display device. Method 800 may be implemented in touch-sensitive display device 300 of FIG. 6, for example.

Method 800 includes, at 802, causing, at a controller in the touch-sensitive display device, a transmit electrode driver to drive a plurality of transmit electrodes in an electrode matrix in a mutual capacitance mode, and detecting touch inputs based on resulting currents on a plurality of receive electrodes in the electrode matrix. For example, controller 302 of FIG. 6 may cause Tx driver 304 to drive Tx electrodes 112 in electrode matrix 102 in the mutual capacitance mode, and may detect touch inputs based on resulting currents on Rx electrodes 110 in the electrode matrix.

Method 800 includes, at 804, causing the transmit electrodes, the receive electrodes, and a conductive plane to be connected to a common charging voltage during charge periods of a self-capacitance mode. For example, controller 302 may cause Tx electrodes 112, Rx electrodes 110, and conductive plane 120 to be connected to the common charging voltage $V_{charge}$ (e.g., via coupling to voltage source 403 through actuation of switches 402) during charge periods of the self-capacitance mode.

Method 800 includes, at 806, causing, during discharge periods of the self-capacitance mode that alternate with the charge periods, the transmit electrodes, the receive electrodes, and the conductive plane to be connected to a common reference voltage. For example, controller 302 may cause, (luring the discharge periods of the self-capacitance mode that alternate with the charge periods, Tx electrodes 112, Rx electrodes 110, and conductive plane 120 to be connected to the common reference voltage $V_{ref}$ (e.g., via respective coupling to C2D 407, C2D 306, and C2D 308 through actuation of switches 404).

Method 800 includes, at 808, causing, during the discharge periods of the self-capacitance mode, the transmit electrodes and the receive electrodes to be coupled to receive circuitry configured to measure self-capacitance of the transmit electrodes and the receive electrodes. For example, controller 302 may cause, during the discharge periods of the self-capacitance mode, Tx electrodes 112 and Rx electrodes 110 to be coupled to receive circuitry (e.g., C2Ds 306, 308, 407) configured to measure self-capacitance of the transmit electrodes and the receive electrodes.

The subject matter of the present disclosure is further described in the following paragraphs. One aspect provides a touch-sensitive display device, comprising an electrode matrix including a plurality of transmit electrodes and a plurality of receive electrodes; a conductive plane; a controller configured to cause a transmit electrode driver to drive the transmit electrodes in a mutual capacitance mode, with touch inputs being detected based on resulting currents on the receive electrodes; the controller configured to cause the transmit electrodes, the receive electrodes, and the conductive plane to be connected to a common charging voltage during charge periods of a self-capacitance mode; the controller configured, during discharge periods of the self-capacitance mode that alternate with the charge periods, to cause the transmit electrodes, the receive electrodes, and the conductive plane to be connected to a common reference voltage; and the controller configured, during the discharge periods of the self-capacitance mode, to cause the transmit electrodes and the receive electrodes to be coupled to receive circuitry configured to measure self-capacitance of the transmit electrodes and the receive electrodes. In this aspect, the receive circuitry may be configured to receive from the conductive plane a capacitive measurement of force applied to a surface of the touch-sensitive display device. In this aspect, at least a portion of the electrode matrix may be configured to resiliently deflect relative to the conductive plane, and the capacitive measurement of force may be measured between the resiliently deflecting portion of the electrode matrix and the conductive plane. In this aspect, the touch-sensitive display device may further comprise a display placed in a shielded position relative to the conductive plane, and the conductive plane may shield the display from electromagnetic interference from the electrode matrix and the electrode matrix from electromagnetic interference from the display. In this aspect, the controller may be configured to cause, in the self-capacitance mode, electrode subsets of the transmit electrodes and the receive electrodes to be multiplexed together, and the receive circuitry may be configured to measure a self-capacitance of each electrode subset. In this aspect, multiplexing the electrode subsets of the transmit electrodes and the receive electrodes may include electrically coupling electrodes together. In this aspect, multiplexing the electrode subsets of the transmit electrodes and the receive electrodes may include, for each electrode subset, summing self-capacitances of each electrode in that electrode subset. In this aspect, the controller may be configured to change a number of electrodes in the electrode subsets over time. In this aspect, the controller may be configured to change the number of electrodes in the electrode subsets based on a z-coordinate of an input object, and the z-coordinate may be determined based on the self-capacitance of the transmit electrodes and the receive electrodes. In this aspect, the controller may be configured to switch between the mutual capacitance mode and the self-capacitance mode based on an input object condition. In this aspect, the controller may be configured to enable each of the mutual capacitance mode, the charge periods of the self capacitance mode, and the discharge periods of the self-capacitance mode by causing actuation of respective switches. In this aspect, the controller may be configured to, in the mutual capacitance mode, cause the conductive plane to be connected to the common reference voltage.

According to another aspect, a method at a controller in a touch-sensitive display device comprises causing a transmit electrode driver to drive a plurality of transmit electrodes in an electrode matrix in a mutual capacitance mode, and detecting touch inputs based on resulting currents on a plurality of receive electrodes in the electrode matrix; causing the transmit electrodes, the receive electrodes, and a conductive plane to be connected to a common charging voltage during charge periods of a self-capacitance mode;

causing, during discharge periods of the self-capacitance mode that alternate with the charge periods, the transmit electrodes, the receive electrodes, and the conductive plane to be connected to a common reference voltage; and causing, during the discharge periods of the self-capacitance mode, the transmit electrodes and the receive electrodes to be coupled to receive circuitry configured to measure self-capacitance of the transmit electrodes and the receive electrodes. In this aspect, the method may comprise receiving from the conductive plane, via the receive circuitry, a capacitive measurement of force applied to a surface of the touch-sensitive display device. In this aspect, the method may comprise causing, in the self-capacitance mode, electrode subsets of the transmit electrodes and the receive electrodes to be multiplexed together; and measuring, via the receive circuitry, a self-capacitance of each electrode subset. In this aspect, the method may comprise changing a number of electrodes in the electrode subsets over time. In this aspect, the method may comprise changing the number of electrodes in the electrode subsets based on a z-coordinate of an input object, and the z-coordinate may be determined based on the self capacitance of the transmit electrodes and the receive electrodes. In this aspect, the method may comprise switching between the mutual capacitance mode and the self-capacitance mode based on an input object condition. In this aspect, the input object condition may include a z-coordinate, and switching between the mutual capacitance mode and the self-capacitance mode based on the input object condition may include interrupting the self-capacitance mode with the mutual capacitance mode at a first interval based on the input object condition, and interrupting the mutual capacitance mode with the self-capacitance mode at a second interval.

According to another aspect, a touch-sensitive display device comprises an electrode matrix including a plurality of transmit electrodes and a plurality of receive electrodes; a conductive plane; a controller configured to cause a transmit electrode driver to drive the transmit electrodes in a mutual capacitance mode, with touch inputs being detected based on resulting currents on the receive electrodes; the controller configured to cause the transmit electrodes, the receive electrodes, and the conductive plane to be connected to a common charging voltage during charge periods of a self-capacitance mode; the controller configured, during discharge periods of the self-capacitance mode that alternate with the charge periods, to cause the transmit electrodes, the receive electrodes, and the conductive plane to be connected to a common reference voltage; and the controller configured, during the discharge periods of the self-capacitance mode, to cause the transmit electrodes and the receive electrodes to be coupled to receive circuitry configured to measure self-capacitance of the transmit electrodes and the receive electrodes, the receive circuitry further configured to receive from the conductive plane a capacitive measurement of force applied to a surface of the touch-sensitive display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch-sensitive display device, comprising:
an electrode matrix including a plurality of transmit electrodes and a plurality of receive electrodes;
a display;
a conductive plane positioned between the electrode matrix and the display;
a controller configured to cause a transmit electrode driver to drive the transmit electrodes in a mutual capacitance mode, with touch inputs being detected based on resulting currents on the receive electrodes;
the controller configured to cause the transmit electrodes, the receive electrodes, and the conductive plane to be contemporaneously connected to a common charging voltage during charge periods of a self-capacitance mode;
the controller configured, during discharge periods of the self-capacitance mode that alternate with the charge periods, to cause the transmit electrodes, the receive electrodes, and the conductive plane to be contemporaneously connected to a common reference voltage; and
the controller configured, during the discharge periods of the self-capacitance mode, to cause the transmit electrodes and the receive electrodes to be coupled to receive circuitry configured to measure self-capacitance of the transmit electrodes and the receive electrodes.

2. The touch-sensitive display device of claim 1, where the receive circuitry is further configured to receive from the conductive plane a capacitive measurement of force applied to a surface of the touch-sensitive display device.

3. The touch-sensitive display device of claim 2, where at least a portion of the electrode matrix is configured to resiliently deflect relative to the conductive plane, and where the capacitive measurement of force is measured between the resiliently deflecting portion of the electrode matrix and the conductive plane.

4. The touch-sensitive display device of claim 1, where the display is placed in a shielded position relative to the conductive plane, the conductive plane shielding the display from electromagnetic interference from the electrode matrix and the electrode matrix from electromagnetic interference from the display.

5. The touch-sensitive display device of claim 1, where the controller is further configured to cause, in the self-capacitance mode, electrode subsets of the transmit electrodes and the receive electrodes to be multiplexed together, and where the receive circuitry is further configured to measure a self-capacitance of each electrode subset.

6. The touch-sensitive display device of claim 5, where multiplexing the electrode subsets of the transmit electrodes and the receive electrodes includes electrically coupling electrodes together.

7. The touch-sensitive display device of claim 5, where multiplexing the electrode subsets of the transmit electrodes and the receive electrodes includes, for each electrode subset, summing self-capacitances of each electrode in that electrode subset.

8. The touch-sensitive display device of claim 5, where the controller is configured to change a number of electrodes in the electrode subsets over time.

9. The touch-sensitive display device of claim 8, where the controller is configured to change the number of electrodes in the electrode subsets based on a z-coordinate of an input object, the z-coordinate being determined based on the self-capacitance of the transmit electrodes and the receive electrodes.

10. The touch-sensitive display device of claim 1, where the controller is further configured to switch between the mutual capacitance mode and the self-capacitance mode based on an input object condition.

11. The touch-sensitive display device of claim 1, where the controller is further configured to enable each of the mutual capacitance mode, the charge periods of the self-capacitance mode, and the discharge periods of the self-capacitance mode by causing actuation of respective switches.

12. The touch-sensitive display device of claim 1, where the controller is further configured to, in the mutual capacitance mode, cause the conductive plane to be connected to the common reference voltage.

13. The touch-sensitive display device of claim 1, where the electrode matrix, the display, and the conductive plane form a stack, and where the conductive plane includes a discrete layer separate from the electrode matrix and the display.

14. The touch-sensitive display device of claim 1, where the conductive plane covers substantially an entire area of the display.

15. At a controller in a touch-sensitive display device, a method, comprising:
   causing a transmit electrode driver to drive a plurality of transmit electrodes in an electrode matrix in a mutual capacitance mode, and detecting touch inputs based on resulting currents on a plurality of receive electrodes in the electrode matrix;
   causing the transmit electrodes, the receive electrodes, and a conductive plane to be contemporaneously connected to a common charging voltage during charge periods of a self-capacitance mode, the conductive plane positioned between the electrode matrix and a display;
   causing, during discharge periods of the self-capacitance mode that alternate with the charge periods, the transmit electrodes, the receive electrodes, and the conductive plane to be contemporaneously connected to a common reference voltage; and
   causing, during the discharge periods of the self-capacitance mode, the transmit electrodes and the receive electrodes to be coupled to receive circuitry configured to measure self-capacitance of the transmit electrodes and the receive electrodes.

16. The method of claim 15, further comprising receiving from the conductive plane, via the receive circuitry, a capacitive measurement of force applied to a surface of the touch-sensitive display device.

17. The method of claim 15, further comprising:
   causing, in the self-capacitance mode, electrode subsets of the transmit electrodes and the receive electrodes to be multiplexed together; and
   measuring, via the receive circuitry, a self-capacitance of each electrode subset.

18. The method of claim 17, further comprising changing a number of electrodes in the electrode subsets over time.

19. The method of claim 18, further comprising changing the number of electrodes in the electrode subsets based on a z-coordinate of an input object, the z-coordinate being determined based on the self-capacitance of the transmit electrodes and the receive electrodes.

20. The method of claim 15, further comprising switching between the mutual capacitance mode and the self-capacitance mode based on an input object condition.

21. The method of claim 20,
   where the input object condition includes a z-coordinate, and
   where switching between the mutual capacitance mode and the self-capacitance mode based on the input object condition includes interrupting the self-capacitance mode with the mutual capacitance mode at a first interval based on the input object condition, and interrupting the mutual capacitance mode with the self-capacitance mode at a second interval.

22. A touch-sensitive display device, comprising:
   an electrode matrix including a plurality of transmit electrodes and a plurality of receive electrodes;
   a display;
   a conductive plane positioned between the electrode matrix and the display;
   a controller configured to cause a transmit electrode driver to drive the transmit electrodes in a mutual capacitance mode, with touch inputs being detected based on resulting currents on the receive electrodes;
   the controller configured to cause the transmit electrodes, the receive electrodes, and the conductive plane to be contemporaneously connected to a common charging voltage during charge periods of a self-capacitance mode;
   the controller configured, during discharge periods of the self-capacitance mode that alternate with the charge periods, to cause the transmit electrodes, the receive electrodes, and the conductive plane to be contemporaneously connected to a common reference voltage; and
   the controller configured, during the discharge periods of the self-capacitance mode, to cause the transmit electrodes and the receive electrodes to be coupled to receive circuitry configured to measure self-capacitance of the transmit electrodes and the receive electrodes, the receive circuitry further configured to receive from the conductive plane a capacitive measurement of force applied to a surface of the touch-sensitive display device.

* * * * *